United States Patent
Hirakawa et al.

(10) Patent No.: US 6,832,272 B2
(45) Date of Patent: Dec. 14, 2004

(54) CLUSTERING STORAGE SYSTEM

(75) Inventors: Yuusuke Hirakawa, Tokyo (JP); Hiroshi Arakawa, Tokyo (JP); Takashi Oeda, Tokyo (JP); Kouji Arai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 221 days.

(21) Appl. No.: 09/927,571

(22) Filed: Aug. 10, 2001

(65) Prior Publication Data

US 2002/0188768 A1 Dec. 12, 2002

(30) Foreign Application Priority Data

Jun. 12, 2001 (JP) .................................... 2001-177180

(51) Int. Cl.[7] ............................................... G06F 3/00
(52) U.S. Cl. ................... 710/36; 710/38; 710/8
(58) Field of Search ......................... 710/8, 29, 33, 710/36, 38, 40, 41

(56) References Cited

U.S. PATENT DOCUMENTS

| | | | | |
|---|---|---|---|---|
| 5,155,845 A | * | 10/1992 | Beal et al. | 714/6 |
| 5,682,512 A | * | 10/1997 | Tetrick | 711/202 |
| 5,729,761 A | * | 3/1998 | Murata et al. | 710/14 |
| 5,819,054 A | * | 10/1998 | Ninomiya et al. | 712/3 |
| 6,012,119 A | * | 1/2000 | Ninomiya et al. | 710/305 |
| 6,073,218 A | * | 6/2000 | DeKoning et al. | 711/150 |
| 6,112,257 A | * | 8/2000 | Mason, Jr. et al. | 710/18 |
| 6,182,166 B1 | * | 1/2001 | Shklarsky et al. | 710/33 |
| 6,421,711 B1 | * | 7/2002 | Blumenau et al. | 709/213 |

FOREIGN PATENT DOCUMENTS

JP          11-167521          6/1999

* cited by examiner

Primary Examiner—Jeffrey Gaffin
Assistant Examiner—David Martinez
(74) Attorney, Agent, or Firm—Townsend and Townsend and Crew LLP

(57) ABSTRACT

A clustering storage system capable of operating a plurality of storage system units as a single storage system by connecting the storage system units with one another by means of data connection lines collects access information to the system. The access information is collected in a unit of combination of a logical port receiving an access command from a host computer and a logical volume constituting a unit for management of data. A combination of the logical port and the logical volume having a high frequency of data transfer between the storage system units are detected with reference to the collected access information and the logical port is remapped or the logical volume between the storage system units is remapped.

12 Claims, 14 Drawing Sheets

FIG.3

| LOGICAL PORT NO. | STORAGE SYSTEM UNIT NO. | PHYSICAL PORT NO. | LOGICAL VOLUME NO. | HOST COMPUTER NO. |
|---|---|---|---|---|
| 1 | 1 | 1 | 2 | 1 |
| 2 | 1 | 1 | 1 | 1 |
| 3 | 1 | 2 | 1 | 2 |
| 4 | 1 | 2 | 3 | 2 |
| 5 | 2 | 1 | 0 | 0 |
| 6 | 2 | 1 | 0 | 0 |
| 7 | 2 | 2 | 4 | 2 |
| 8 | 2 | 2 | 0 | 2 |
| 9 | 3 | 1 | 5 | 1 |
| 10 | 3 | 1 | 6 | 1 |
| 11 | 3 | 2 | 6 | 3 |
| 12 | 3 | 2 | 0 | 3 |
| 13 | 4 | 1 | 5 | 1 |
| 14 | 4 | 1 | 0 | 1 |
| 15 | 4 | 2 | 5 | 4 |
| 16 | 4 | 2 | 0 | 4 |

400 PORT INFORMATION

FIG.4

| LOGICAL VOLUME NO. | PHYSICAL STORAGE POSITION INFORMATION | FORMAT | CAPACITY (GB) | STATE INFORMATION | REMAPPING PHYSICAL STORAGE POSITION INFORMATION | REMAPPED PHYSICAL STORAGE POSITION | LOGICAL PORT NO. |
|---|---|---|---|---|---|---|---|
| 1 | 1,0 | OPEN3 | 3 | NORMAL | 0,0 | 0 | 2,3 |
| 2 | 2,0 | OPEN6 | 6 | REMAPPING | 1,500 | 300 | 1 |
| 3 | 1,500 | OPEN6 | 6 | REMAPPING | 2,0 | 300 | 4 |
| 4 | 2,1000 | OPEN3 | 3 | NORMAL | 0,0 | 0 | 7 |
| 5 | 3,0 | OPEN3 | 3 | NORMAL | 0,0 | 0 | 9,13,15 |
| 6 | 3,500 | OPEN3 | 3 | NORMAL | 0,0 | 0 | 10,11 |

500 PHYSICAL ADDRESS INFORMATION

FIG.5

| STORAGE SYSTEM UNIT NO. | UNUSED CAPACITY (GB) |
|---|---|
| 1 | 20 |
| 2 | 40 |
| 3 | 10 |
| 4 | 0 |

600 UNUSED CAPACITY INFORMATION

FIG.6

| LOGICAL PATH NO. | LOGICAL PORT NO. | LOGICAL VOLUME NO. | ACCESS FREQUENCY |
|---|---|---|---|
| 1 | 1 | 2 | 20 |
| 2 | 2 | 1 | 15 |
| 3 | 3 | 1 | 15 |
| 4 | 4 | 3 | 10 |
| 5 | 7 | 4 | 13 |
| 6 | 9 | 5 | 10 |
| 7 | 10 | 6 | 5 |
| 8 | 11 | 6 | 2 |
| 9 | 13 | 5 | 11 |
| 10 | 15 | 5 | 6 |

700 ACCESS INFORMATION

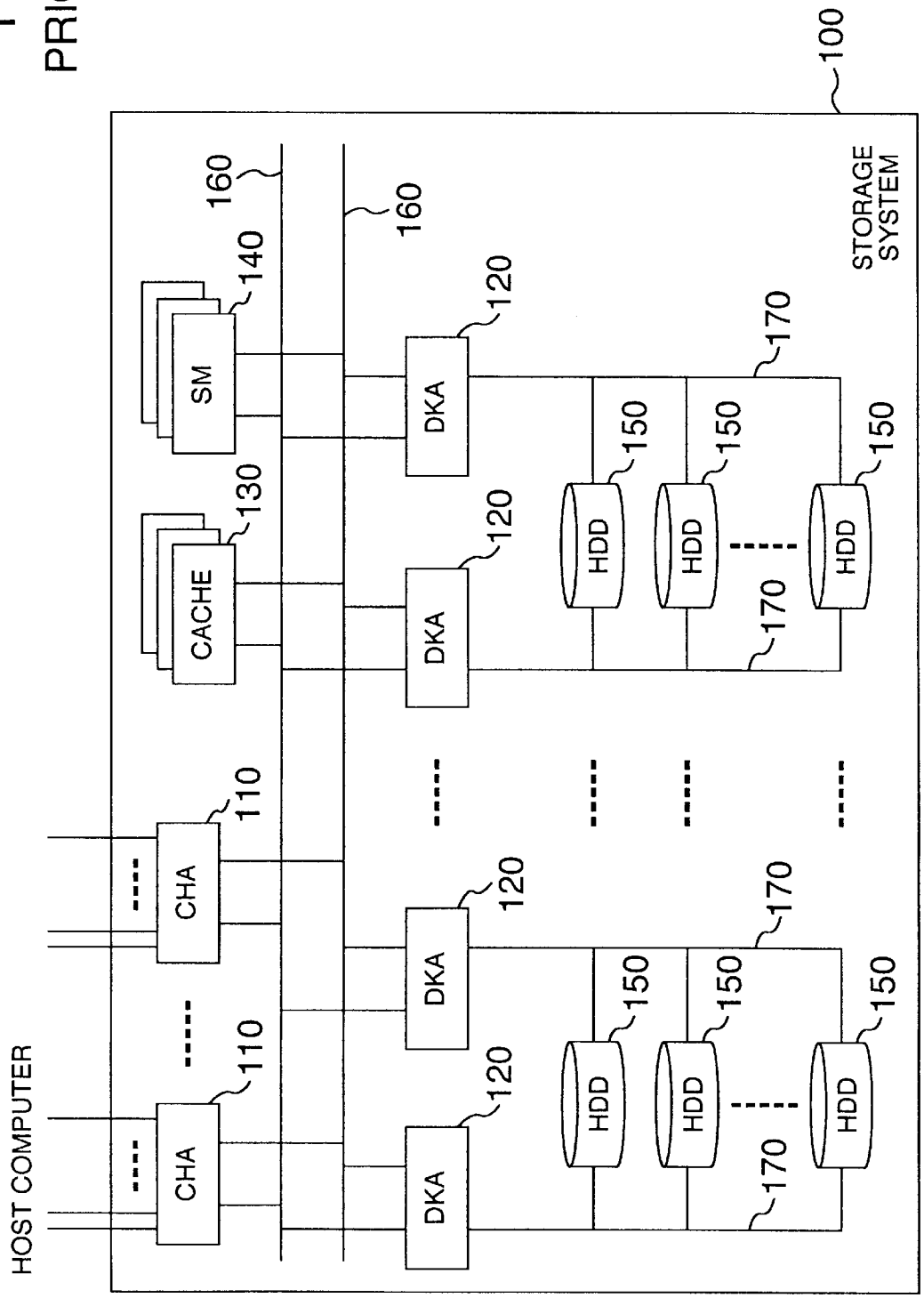

CLUSTERING STORAGE SYSTEM

CROSS REFERENCE TO RELATED APPLICATION

This application is related to and claims priority from Japanese Application No. 2001-177180, filed Jun. 12, 2001.

BACKGROUND OF THE INVENTION

The present invention relates to a storage system and more particularly to a clustering storage system capable of operating a plurality of storage system unit as a single storage system.

As a prior art of a storage system, a technique disclosed in, for example, JP-A-11-167521 is known. In this prior art, interfaces (host adapters CHA) to high-ranking apparatuses (host computers) which use the storage system, interfaces (disk adapters DKA) to storage devices such as magnetic disk devices within the storage system, cache memories (CACHE), and shared memories (SM) are connected with one another in a common path manner.

FIG. 15 is a block diagram illustrating a configuration example of such a storage system of the prior art. Referring now to FIG. 15, the prior art is described. In FIG. 15, numeral 100 denotes the storage system, 110 host adapters (CHA), 120 disk adapters (DKA), 130 cache memories (CACHE), 140 shared memories (SM), 150 storage devices (HDD), 160 common paths, and 170 connection lines.

The storage system 100 of the prior art includes, as shown in FIG. 15, the host adapters 110, the disk adapters 120, the cache memories 130, the shared memories 140, the storage devices 150, the common paths 160 and the connection lines 170. The host adapters 110, the disk adapters 120, the cache memories 130 and the shared memories 140 are connected with one another by means of the common paths. The common paths 160 are duplicated in case a failure of the common path 160 occurs. Each of the storage devices 150 is connected to two disk adapters 120 by means of different connection lines 170 so that each storage device 150 can be used even upon failure of one disk adapter 120 or one connection line 170.

The host adapters 110 control data transfer between host computers not shown and the cache memories 130. The disk adapters 120 control data transfer between the cache memories 130 and the storage devices 150. The cache memories 130 are memories for temporarily storing data received from the host computers and data read out from the storage devices 150. The shared memories 140 are memories shared by all of the host adapters 110 and disk adapters 120. Further, although not shown, a maintenance terminal (SVP) for performing setting, monitoring, maintenance and the like of the storage system 100 is connected to all of the host adapters 110 and disk adapters 120 by means of a hot line.

The case where the system configuration of the storage system 100 having the above configuration is expanded is now considered. In such a case, heretofore, constituent elements such as the host adapters 110, the disk adapters 120, the cache memories 130, the shared memories 140 and the storage devices 150 are newly added within the storage system 100. For example, when the number of host computers is increased, a host adapter 110 is newly connected to the common paths 160. Further, when the memory capacity of the storage system 100 is increased, a storage device 150 is added within the storage system 100 or a disk adapter 120 is newly connected to the common paths 160 and a storage device 150 is added.

SUMMARY OF THE INVENTION

In the above prior art, in order to expand the storage system, the host adapter, the disk adapter, the cache memory, the shared memory, the storage device and the like are increased as constituent elements of the storage system. Accordingly, the expansibility of the storage system is limited to the maximum mountable number of constituent elements in the storage system. Consequently, in the prior art, in order to satisfy a request for a large-scale storage system, the storage system having the increased maximum mountable number of constituent elements must be adopted from the introduction time of the storage system. As a result, when a small-scale storage system is not expanded as it is, there occurs a problem relative to increased cost and installation area and the like.

As a method of solving the above problem, a clustering storage system is considered. The clustering storage system includes a plurality of storage system units connected with one another and each unit constituted by the aforementioned storage system and can operate as a single storage system as viewed from the host computers. A unit of system for constituting the clustering storage system is hereinafter named a storage system unit. When a small-scale storage system is required, a clustering storage system can be constituted by a small number of storage system units, while when the scale of the storage system is expanded, the expansion can be solved by increasing the storage system units in the clustering storage system. In this manner, the clustering storage system can applicable to from a small-scale system to a large-scale system and can operate as a single storage system as viewed from the host computers. Accordingly, it is advantageous that management thereof is easy.

In the clustering storage system, however, there occurs a case where a storage system unit for receiving an access command from a host computer and a storage system unit for storing data to be accessed are different. Consequently, there is a problem that data transfer between the storage system units is required and the access performance is degraded.

It is an object of the present invention to solve the above problem in the conventional clustering storage system by providing a clustering storage system capable of improving the access performance.

According to the present invention, the above object can be achieved by a clustering storage system capable of operating a plurality of storage system units as a single storage system, comprising means for collecting access information within the storage system units and between the storage system units, means for showing the collected access information to a maintenance person, means for receiving at least one of a remapping command of port and a remapping command of data from the maintenance person, and at least one of means for remapping ports in the clustering storage system and means for remapping data between the storage system units in accordance with the command.

The access information contains, for example, a data transfer amount or time necessary for data transfer in a unit time within the storage system units and between the storage system units. The access information is collected for a unit of combination of a logical port receiving an access command and a logical volume constituting a unit for management of data. By collecting the access information, it is understood that an access by a host computer from which logical port to which logical volume requires a lot of data transfer between the storage system units. The maintenance person can refer to the access information by means of the maintenance terminal. Accordingly, the maintenance person can recognize a combination of the logical port and the logical volume having a high frequency of data transfer between the storage system units and study remapping of the logical port and the logical volume. Further, the clustering storage system can perform remapping of the ports and the logical volumes between the storage system units in response to a command from the maintenance person to make lower the frequency of data transfer between the storage system units. Thus, the access performance of the clustering storage system can be improved.

Further, according to the present invention, the clustering storage system or the maintenance terminal in the clustering storage system can be provided with the function of studying remapping of the ports and the logical volumes on the basis of the access information to thereby reduce burden on the maintenance person.

In addition, according to the present invention, the clustering storage system may be provided with the function of providing the access information to the host computer using the clustering storage system and the function of receiving a port remapping command and a logical volume remapping command from the host computer. Consequently, the host computer or a manager of the host computer can study remapping of the ports and the logical volumes on the basis of the access information and the operation situation and instruct the clustering storage system to execute the port remapping command and the logical volume remapping command. Thus, the remapping of the ports and the logical volumes can be performed under high-degree conditions difficult for the maintenance person to judge and the access performance of the clustering storage system can be improved.

BRIEF DESCRIPTION OF THE DRAWINGS

FIG. 3 is a diagram for explaining an example of port information;

FIG. 4 is a diagram for explaining an example of physical address information;

FIG. 5 is a diagram for explaining an example of unused capacity information;

FIG. 6 is a diagram for explaining an example of access information;

FIG. 15 is a block diagram illustrating a conventional storage system.

DESCRIPTION OF THE EMBODIMENTS

Embodiments of a storage system according to the present invention are now described in detail with reference to the accompanying drawings.

In the embodiments of the present invention described below, a clustering storage system including a plurality of storage systems collects access information and shows it to a maintenance person through a maintenance terminal provided within or outside of the clustering storage system, so that change of a logical port for receiving an access command or remapping of data into storage devices within the clustering storage system is performed in accordance with a remapping command of the maintenance person based on the access information.

In the following description, storage systems constituting the clustering storage system are named storage system units. Further, the maintenance terminal may be provided within the clustering storage system or outside thereof. In any case, it is required that the maintenance terminal can be connected to the respective storage system units.

Figure 1:
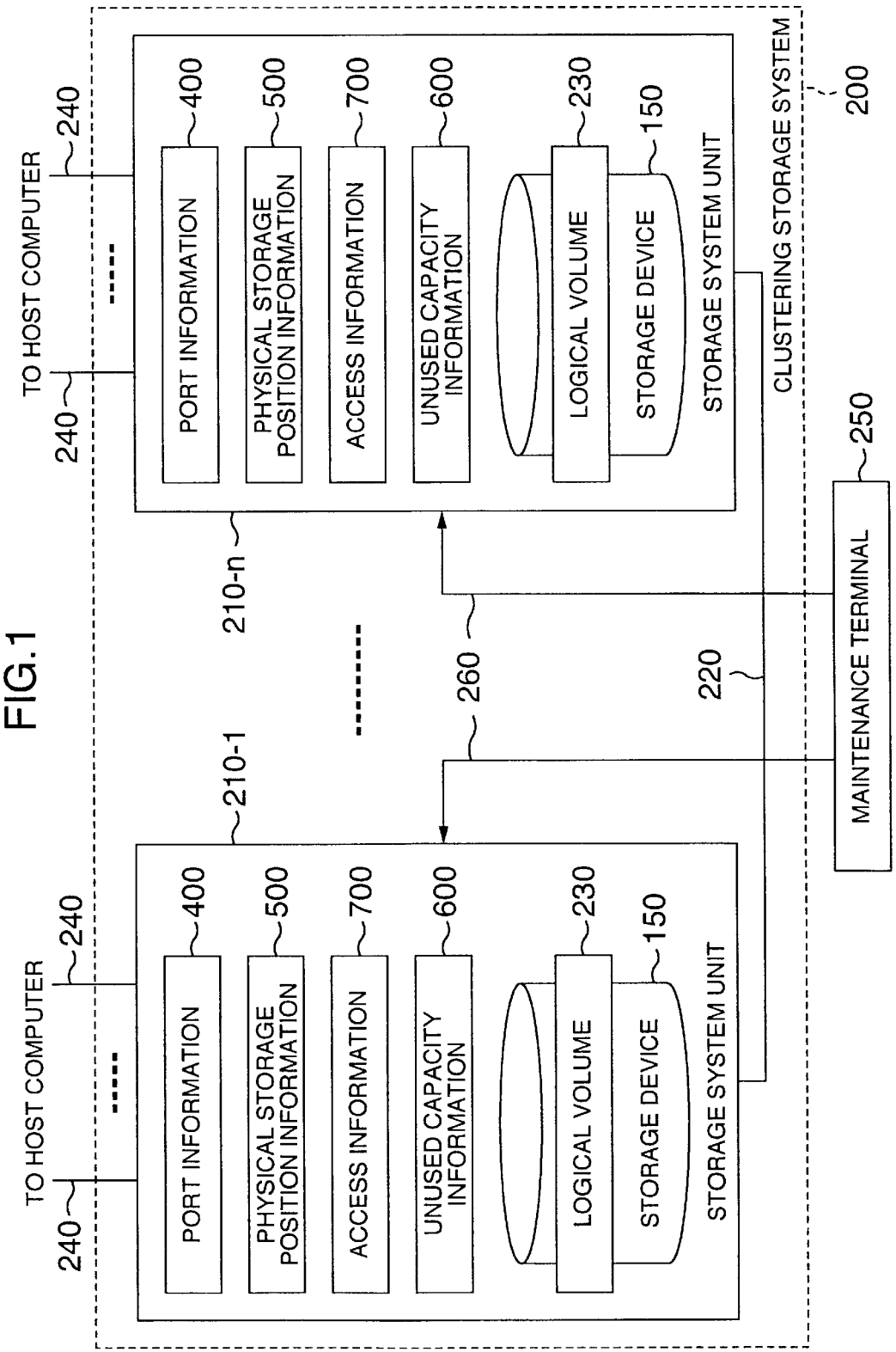
FIG. 1 is a block diagram schematically illustrating a clustering storage system according to an embodiment of the present invention.
Figure 2:
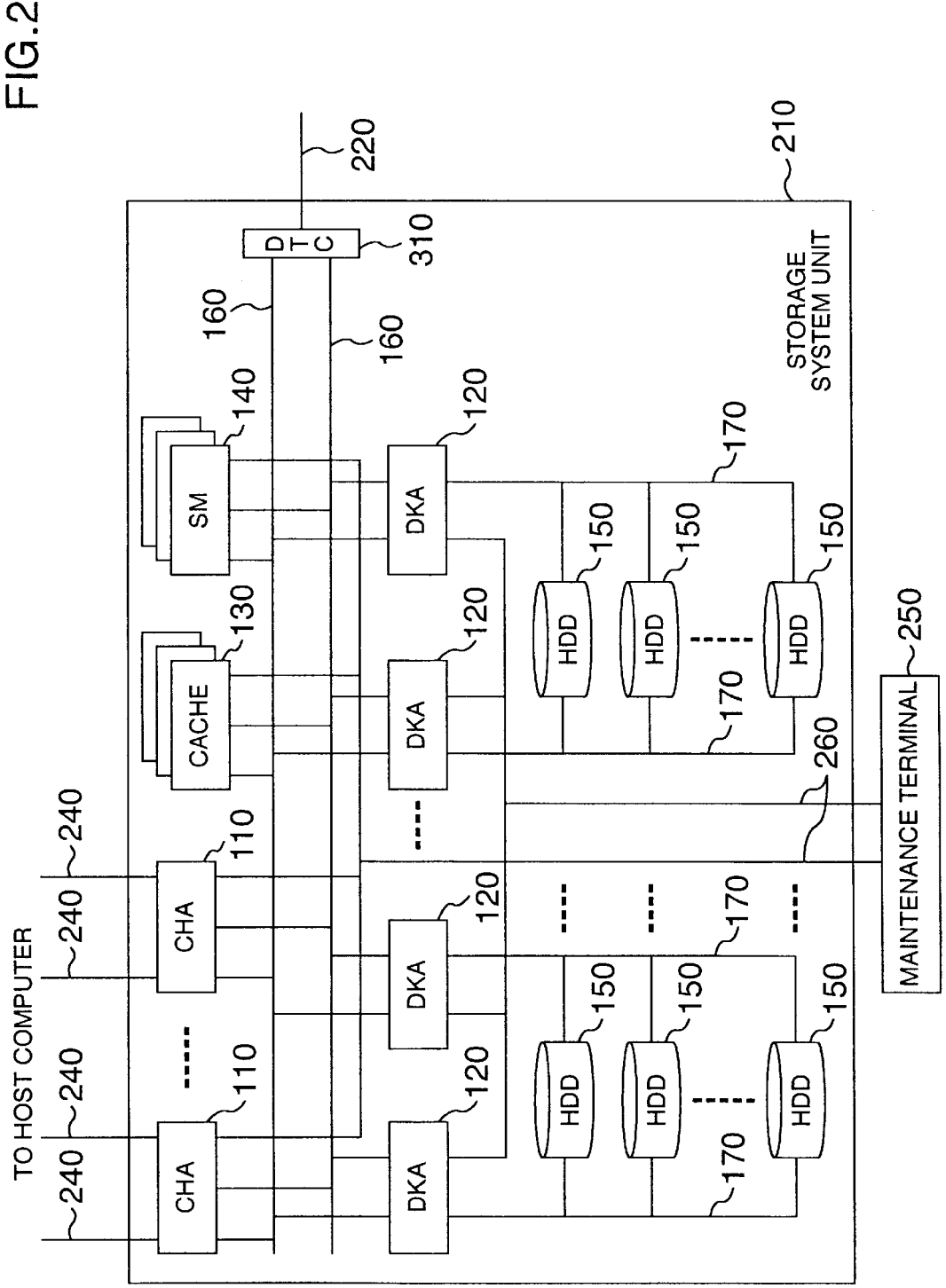
FIG. 2 is a block diagram schematically illustrating a storage system unit.

FIG. 1 is a block diagram schematically illustrating the clustering storage system according to an embodiment of the present invention. FIG. 2 is a block diagram schematically illustrating the storage system unit. FIG. 3 is a diagram for explaining an example of port information. FIG. 4 is a diagram for explaining an example of physical address information. FIG. 5 is a diagram for explaining an example of unused capacity information. FIG. 6 is a diagram for explaining an example of access information.

In FIGS. 1 to 6, numeral 200 denotes a clustering storage system, 210-1 to 210-n denote n storage system units, 220 a connection line, 230 logical volumes, 240 ports, 310 a data transmission controller (DTC), 400 port information, 500 physical address information, 600 unused capacity information and 700 access information. Other reference numerals are the same as those of FIG. 15.

The clustering storage system 200 according to the embodiment of the present invention includes a plurality of storage system units 210-1 to 210-n (hereinafter referred to as 210 simply when it is not necessary to distinguish the respective units or when the whole of the storage system units is indicated) connected with one another by means of the connection line 220. The maintenance terminal 250 is connected to all of the storage system units 210 by means of hot line 260.

The clustering storage system 200 includes the port information 400, the physical storage position information 500, the unused capacity information 600 and the access information 700. The maintenance terminal 250 can refer to these information items. A storage area of the clustering storage system 200 is divided and each of the divided storage areas is named a logical volume 230. A format and a storage capacity of each logical volume can be designated by means of the maintenance terminal 250. The logical volume 230 can be divided to be stored in a plurality of storage devices 150 within each storage system unit 210. A physical storage location (physical address) within the clustering storage system 200 of the logical volume 230 is held in the physical storage position information 500 described later.

Each of the storage system units 210 has basically the same internal configuration as described with reference to FIG. 15, while the clustering storage system according to the present invention is characterized in that the plurality of storage system units 210-1 to 210-n are connected with one another by means of the connection line 220. The present invention pays attention to reduction of the amount of data to be transferred through the connection line 220. The storage system unit 210 is different from the storage system 100 described with reference to FIG. 15 in that the storage system unit 210 includes the data transmission controller 310 for communication with other storage system units 210. The storage system unit 210 includes one or more host adapters 110, one or more disk adapters 120, one or more cache memories 130, one or more shared memories 140, one or more storage devices 150, one or more common paths 160, one or more connection lines 170, and one or more data transmission controllers 310. The host adapters 110, the disk adapters 120, the cache memories 130, the shared memories 140 and the data transmission controllers 310 are connected with one another by means of the common paths 160. The common paths 160 are duplicated in case a failure of the common path 160 occurs. The disk adapters 120 are connected to the storage devices 150 by means of the connection lines 170. Further, the maintenance terminal (SVP) 250 are connected to all of the host adapters 110 and disk adapters 120 by means of the hot lines 260 in order to perform setting, monitoring, maintenance and the like of the clustering storage system 200.

The host adapters 110 control data transfer between the host computers not shown and the cache memories 130. The host adapter 110 includes a plurality of physical ports 240 for connection to the host computers and one physical port 240 may include one or more logical ports. The disk adapters 120 control data transfer between the cache memories 130 and the storage devices 150. The cache memories 130 are memories for temporarily storing data received from the host computers or data read out from the storage devices 150. The shared memories 140 are memories shared by all of the host adapters 110 and disk adapters 120 in the clustering storage system 200. The host adapters 110 and the disk adapters 120 can use the data transmission controller 310 and the connection line 220 to perform communication with the host adapters 110 and the disk adapters 120 in other storage system units 210 and employ the cache memories 130 and the shared memories 140 in other storage system units 210.

The port information 400 includes for each logical port the number of a storage system unit and the number of a physical port having the logical port and the numbers of a logical volume and the host computer to be accessed by using the logical port. The port information 400 is stored in a memory which can be used by the host adapter 110, for example, the shared memory 140 or an inner memory of the host adapter 110. In the example of the port information 400 shown in FIG. 3, a numerical value (for example "0") which is not used as the logical volume number and the host computer number is set as the logical volume number and the host computer number for the logical port corresponding to a physical port which is not connected to the host computer in order to represent that the logical port is not used. A numerical value (for example "0") which is not used as the logical volume number is set as the logical volume number for the logical port which is not used in order to represent that the logical port is not used.

In the case of the example shown in FIG. 3, "0" is used in order to indicate that the logical port is not used. In the port information shown in FIG. 3, the information relative to the logical port 3 represents that the logical port 3 is a logical port in the physical port 2 of the storage system unit 1 and the host computer 2 is used for accessing the logical volume 1. The information relative to the logical port 5 represents that the logical port 5 is a logical port in the physical port 1 of the storage system unit 2 and the physical port 1 of the storage system unit 2 is not connected to any host computers. Further, the information relative to the logical port 8 represents that the logical port 8 is a logical port in the physical port 2 of the storage system unit 2 and the logical port is not used in any logical volumes.

The physical storage position information 500 includes physical address information, a format, a capacity, state information, remapping physical address information for remapping and remapped physical address of the logical volume 230 and the logical port number used to access the logical volume. The physical storage position information 500 is stored in a memory capable of being referred from the host adapter 110, for example, the shared memory 140 or an inner memory of the host adapter 110. In the physical storage position information 500 shown in FIG. 4, the physical address information indicates a physical storage position of the logical volume 230 in the clustering storage system 200 and includes a storage system unit number and a physical storage position in the storage system unit, for example. In the example shown in FIG. 4, these are marked off by a comma. The state information represents a logical state of the logical volume 230 such as "normal" and "remapping". The remapping physical address information and the remapped physical address are effective only when the state information is "remapping". The remapping physical address information is a physical address of a destination logical volume for remapping obtained by logical volume remapping processing described later. The remapped physical address is a physical storage position in the logical volume that remapping processing of data is completed.

When the state information is "normal", the physical address information is used as a physical address of the logical volume. When the state information is "remapping", any one of the physical address information or the remapping physical address information is used as the physical address of the logical volume depending on an address (logical address in an access command) in the logical volume of data to be accessed. For example, when data is remapped from the head of the logical volume, the data to be accessed is already remapped if the logical address is before the remapped physical address and accordingly the remapping physical address information is used as the physical address of the logical volume. On the other hand, if the logical address is behind the remapped physical address, the data to be accessed is not remapped and accordingly the physical address information is used as the physical address of the logical volume.

Since one logical volume can be accessed from a plurality of host computers simultaneously, a plurality of logical port numbers exist for one logical volume item. In the example shown in FIG. 4, the information for the logical volume 1 represents that it is stored from an address of 0 starting from the head of the storage system unit 1, the format is OPEN 3, the capacity is 3 GB, data is not remapped and the logical volume 1 is accessed from the host computer through the logical ports 2 and 3. Further, the information for the logical volume 2 represents that it is stored from an address of 0 starting from the head of the storage system unit 2, the format is OPEN 6, the capacity is 6 GB, data is remapped, the destination for remapping is the logical volume stored from an address of 500 starting from the head of the storage system unit 1, data from the head of the logical volume 2 to an address of 300 have been remapped, and the logical volume 2 is accessed from the host computer through the logical port 1.

The unused capacity information 600 includes the unused storage capacity of the storage system unit 210. The unused capacity information 600 is stored in, for example, the shared memory 140. This information is used to examine whether a new logical volume 230 can be prepared in the storage system unit 210 or not. The unused capacity information 600 shown in FIG. 5 represents that the unused storage capacity of the storage system unit 1 is 20 GB, for example.

The access information 700 includes an access frequency for each logical path. The logical path is defined as a virtual path between the logical port and the logical volume. Hereinafter, the storage system unit having a logical port of a certain logical path is named a front unit of the logical path and the storage system unit for storing the logical volume of the logical path is named an end unit of the logical path. The access frequency may be time or a data amount that a logical volume of a certain logical path is accessed within a unit time defined by a predetermined time such as, for example, 60 or 30 seconds by using the logical port of the logical path, for example. The access frequency is updated by the host adapter 110 or the disk adapter 120 upon execution of the access command issued from the host computer. The access information 700 is stored in a memory which can be used by the host adapter 110 or the disk adapter 120 such as, for example, the shared memory 140, the inner memory of the host adapter 110 or the inner memory of the disk adapter 120. Further, the access information 700 is transferred to the maintenance terminal 250 and stored therein at intervals of a previously designated time or in response to a command of the maintenance person. The access information 700 stored in the maintenance terminal 250 can be referred from the maintenance terminal 250, so that the maintenance person can perform logical port remapping processing and logical volume remapping processing described later.

In the example of the access information 700 shown in FIG. 6, when the access frequency is assumed to be, for example, a data transfer amount, the access frequency of the logical path 1 of FIG. 6 represents that an amount of data accessed to the logical volume 2 within a unit time while using the logical port 1 is 20 (a unit thereof is arbitrary but may be MB, for example). When the port information 400 is as shown in FIG. 3 and the physical storage position information 500 is as shown in FIG. 4, the logical port 1 exists in the storage system unit 1 and the logical volume 2 exists in the storage system unit 2. Accordingly, it is understood that the data transfer amount between the storage system units 1 and 2 is 20. The access frequency of the logical path 2 shown in FIG. 6 represents that an amount of data accessed to the logical volume 1 while using the logical port 2 is "15". When the port information 400 is as shown in FIG. 3 and the physical storage position information 500 is as shown in FIG. 4, the logical port 2 exists in the storage system unit 1 and the logical volume 1 exists in the storage system unit 1. Accordingly, it is understood that the data transfer amount within the storage system unit 1 is 15.

Figure 7:
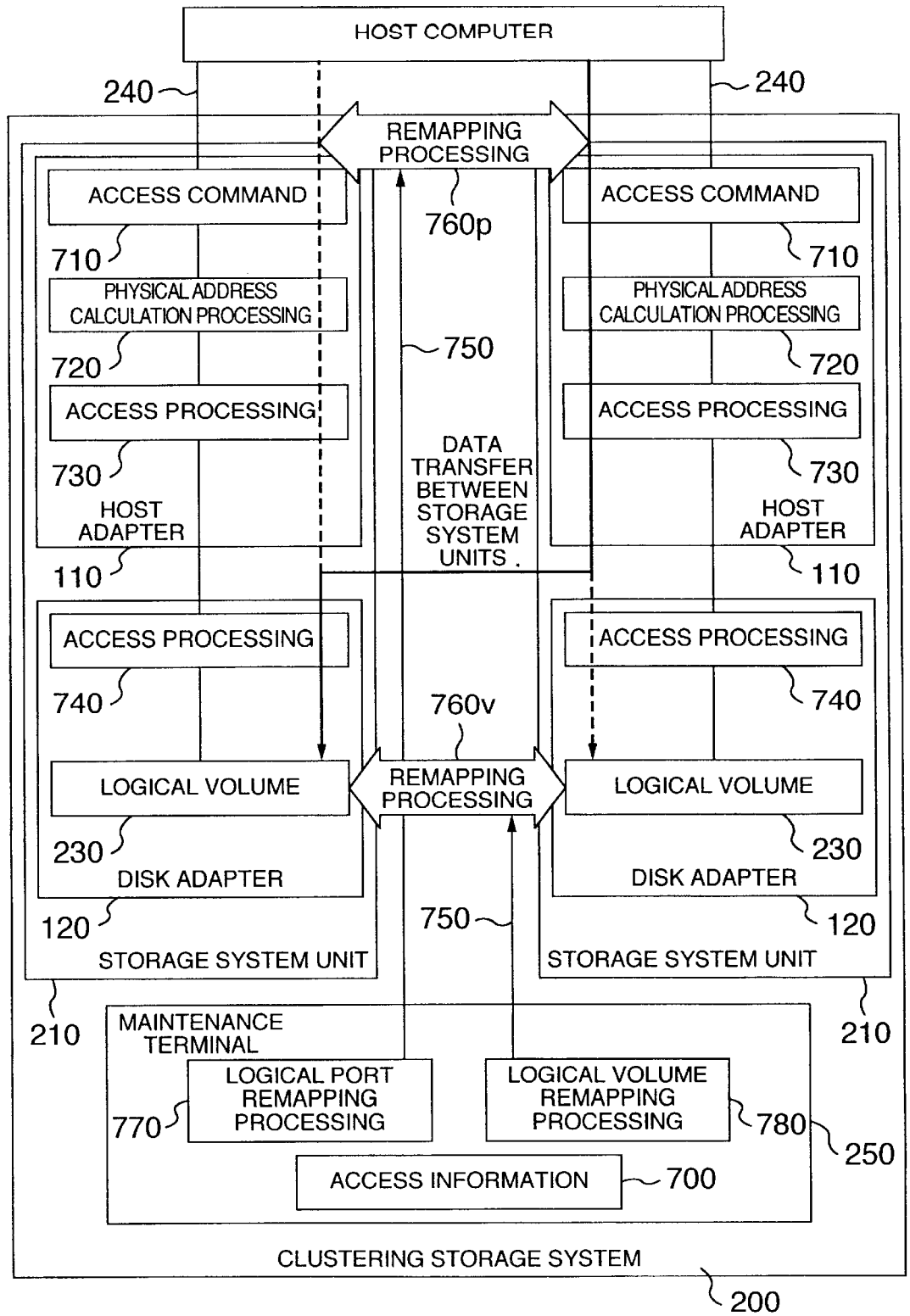
FIG. 7 is a diagram for explaining operation of the clustering storage system.

FIG. 7 is a diagram for explaining operation of the clustering storage system 200. First, operation of the clustering storage system upon reading/writing operation is described.

The host adapter 110 receives an access command 710 from the host computer. The access command 710 from the host computer includes a read (or write) command, an address (logical address) within the logical volume 230 of data to be read (or written) and a data amount. When the host adapter 110 receives the access command 710, the host adapter 110 calculates a physical storage position (physical address) within the clustering storage system 200 of data to be accessed (physical address calculation processing 720). The physical address of the data to be accessed is uniquely determined on the basis of the physical address of the logical volume 230 containing the data to be accessed and the logical address within the access command 710.

After the physical address calculation processing 720, the host adapter 110 performs access processing 730. As an example, operation in case where the access command 710 is a read command is described. The host adapter 110 ensures a memory area equal to the data amount within the access command 710 in the cache memory 130 within the storage system unit having the host adapter 110 or within another storage system unit having the disk adapter 120 corresponding to the physical address calculated in the physical address calculation processing 720. The host adapter 110 commands the disk adapter 120 corresponding to the physical address calculated in the physical address calculation processing 720 to read the data to be accessed and store the data in the cache memory 130. When the disk adapter 120 receives the command from the host adapter 110, the disk adapter 120 reads the data to be accessed from the storage device 150 and stores the data in the cache memory 130. The disk adapter 120 reports completion of transfer to the host adapter 110 (access processing 740). The host adapter 110 transmits the data from the cache memory 130 to the host computer and the reading operation is ended. Thereafter, the host adapter 110 or the disk adapter 120 changes the access frequency of the access information 700 corresponding to the logical path to be accessed. This update of the access frequency may be made always or the maintenance person may issue a command as to whether the access information 700 is updated or not by means of the maintenance terminal 250.

The maintenance person performs logical port remapping processing 770 periodically or if necessary and studies the possibility of reduction of the data transfer amount between the storage system units by remapping of the logical ports. As a result of the study, when the maintenance person judges that the reduction is possible, the maintenance person issues a remapping command 750 to the clustering storage system 200 by means of the maintenance terminal 250 to perform remapping processing 760*p*.

Further, the maintenance person performs logical volume remapping processing 780 periodically or if necessary and studies the possibility of reduction of the data transfer amount between the storage system units by remapping of the logical volumes. As a result of the study, when the maintenance person judges that the reduction is possible, the maintenance person issues a logical volume remapping command 750 to the clustering storage system 200 by means of the maintenance terminal 250 to perform remapping processing 760*v*.

As understood from FIG. 7, the data transfer amount between the storage system units may be reduced by adopting one of two methods including a method of changing setting of the logical ports from that of the storage system unit 2 to that of the storage system unit 1 by the remapping processing 760*p* and a method of moving the logical volume 230 in the storage system unit 1 to the storage system unit 2 by the remapping processing 760*v*.

Figure 8:
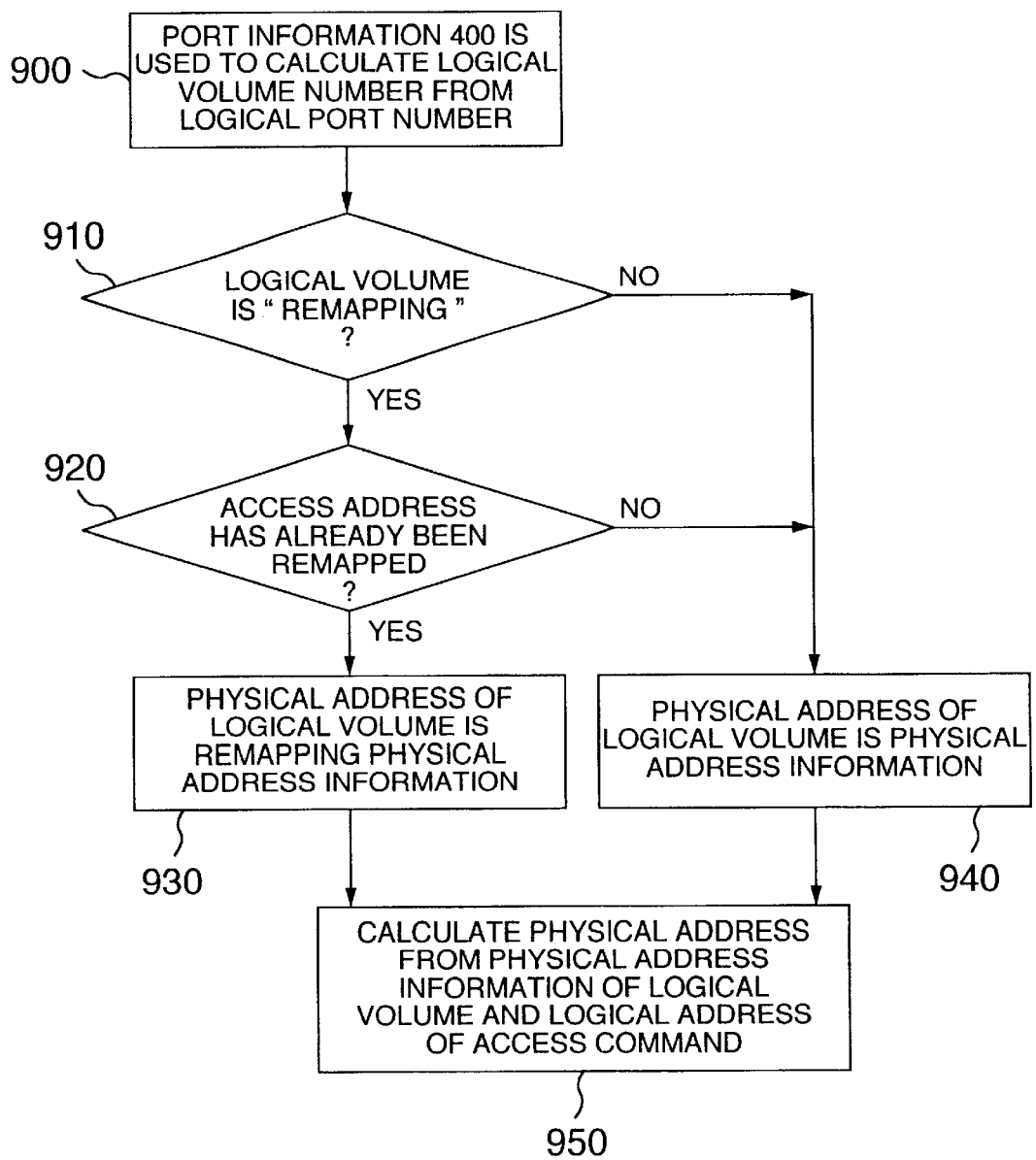
FIG. 8 is a flow chart showing operation of calculating a physical address.

FIG. 8 is a flow chart showing the aforementioned physical address calculation processing 720.

First, the host adapter 110 uses the port information 400 to calculate the logical volume number requested to be accessed on the basis of the logical port number in which the access command 710 has been received (step 900).

Then, in order to calculate a physical address of the logical volume 230 from the logical volume number and the physical storage position information 500, whether the logical volume is "remapping" or not is examined with reference to the state information of the logical volume 230 to be accessed (step 910).

As a result of the examination in step 910, when the logical volume is "remapping", the logical address of the access command 710 is compared with the remapped physical address of the logical volume 230 to be accessed and it is judged whether the logical address of the access command 710 is before the remapped physical address or not, that is, whether the access address has already been remapped or not (step 920).

As a result of the judgment in step 920, when the access address has already been remapped, the physical address of the logical volume 230 is the remapping physical address information (step 930).

When the logical volume is not "remapping" as a result of the examination in step 910 or when the logical address of the access command 710 is behind the remapped physical address, that is, when the access address is not remapped as a result of the judgment in step 920, the physical address of the logical volume 230 and is the physical address information (step 940).

Next, the logical address of the access command 710 is added to the physical address of the logical volume calculated in the processing of step 930 or 940 to obtain the physical address to be accessed (step 950).

As described above, even if the logical volume requested to be accessed is, for example, "remapping", the physical address corresponding to the access request from the host computer can be obtained.

Figure 9:
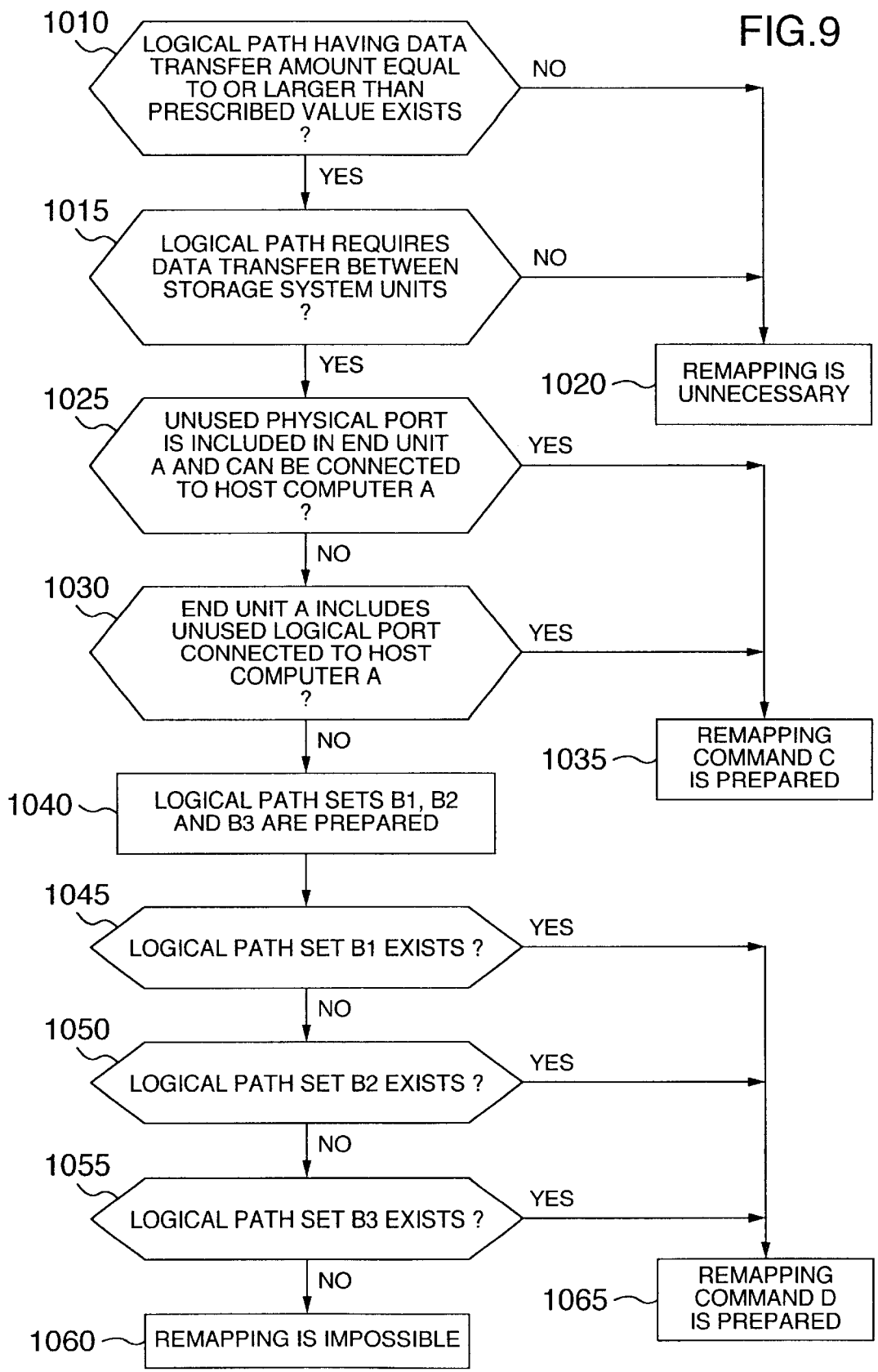
FIG. 9 is a flow chart showing operation of remapping logical ports in FIG. 7.
Figure 10:
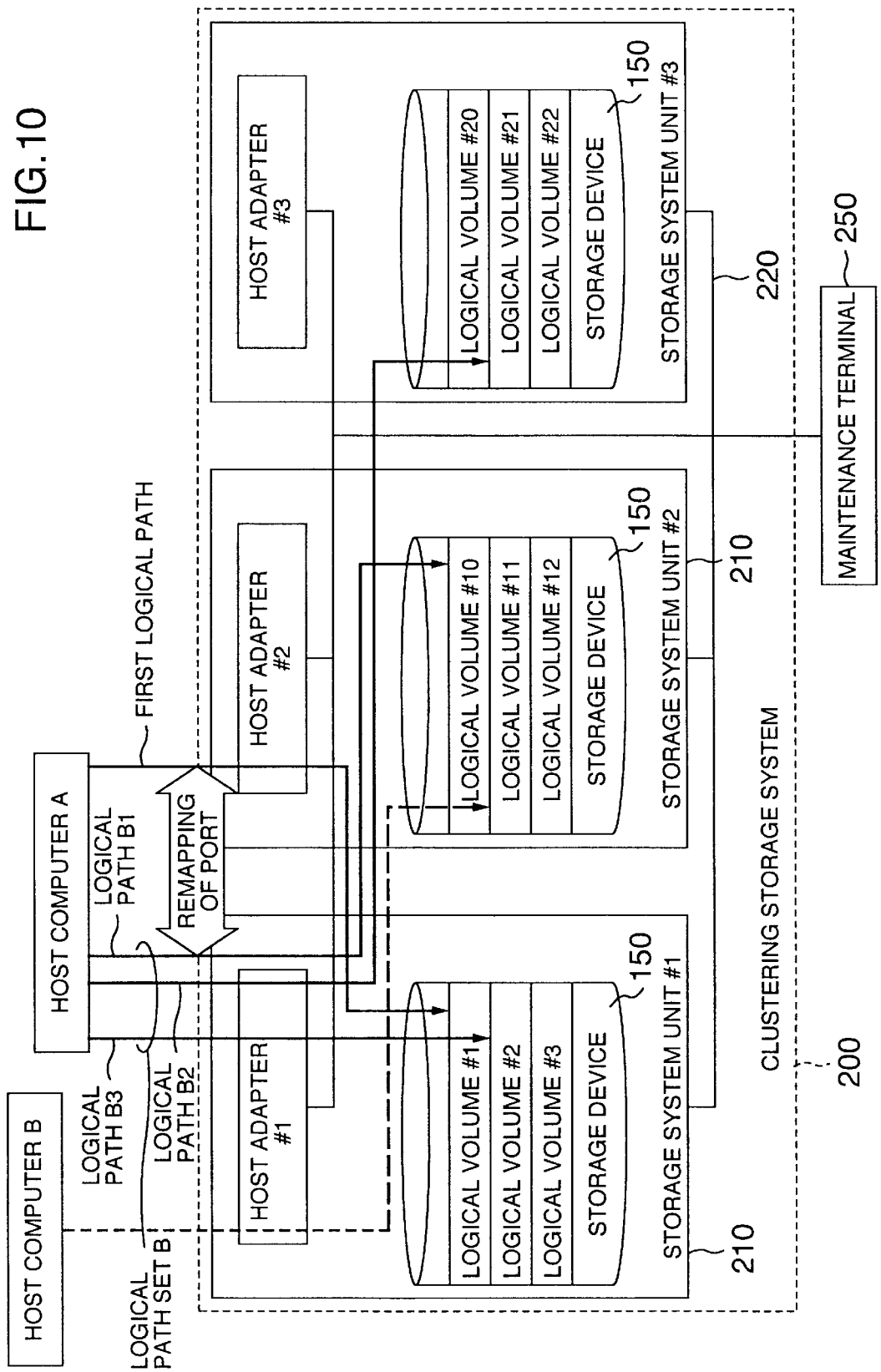
FIG. 10 is a diagram for explaining an example of logical path sets B1 to B3 prepared in the remapping processing of the logical ports.
Figure 13:
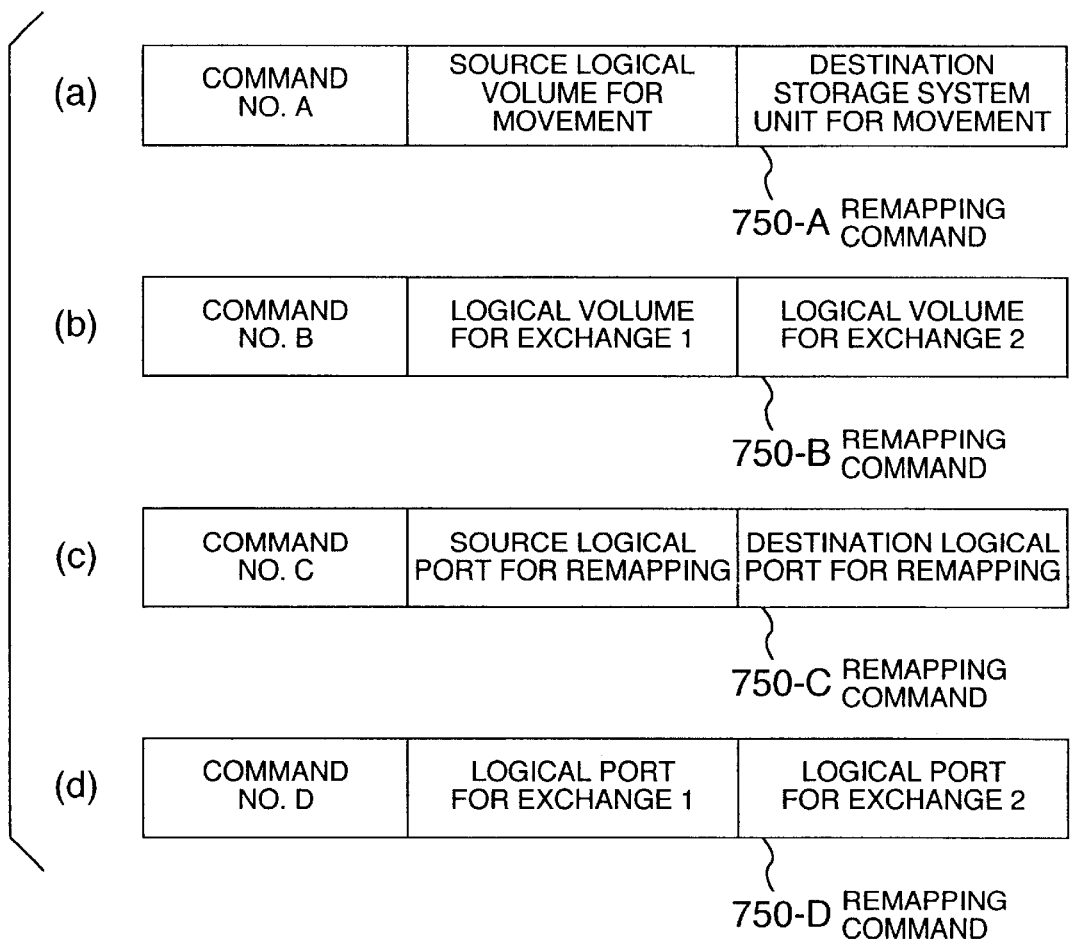
FIG. 13 is a diagram for explaining remapping commands prepared in the logical port remapping processing and the logical volume remapping processing.

FIG. 9 is a flow chart showing the logical port remapping processing 770 in FIG. 7. FIG. 10 is a diagram for explaining an example of logical path sets B1 to B3 prepared in the logical port remapping processing 770. FIG. 13 is a diagram for explaining the remapping commands prepared in the logical port remapping processing 770 and the logical volume remapping processing 780 described later. Description is now made to the case where the access frequency of the access information 700 is the data transfer amount.

Whether a logical path having the data transfer amount equal to or larger than a prescribed value exists in all of the logical paths or not is examined with reference to the access information 700 (step 1010) and when there is no logical path, remapping is judged to be unnecessary and the processing is ended (step 1020).

As a result of the examination in step 1010, when there are a plurality of logical paths having the data transfer amount equal to or larger than the prescribed value, the logical path is selected successively in order of the magnitude of the data transfer amount, for example, and is subjected to the subsequent processing. The selected logical path is named a first logical path. The logical port of the first logical path is assumed to be a logical port A and the logical volume requested to be accessed is assumed to be a logical volume A. A physical port having the logical port A is assumed to be a physical port A, a storage system unit having the logical port A is assumed to be a front unit A, and a storage system unit in which the logical volume A is stored is assumed to be an end unit A. Further, a host computer for accessing the logical volume A by means of the logical port A is assumed to be a host computer A. These information items can be obtained from the port information 400 and the physical storage position information 500. It is examined whether the first logical path requires data transfer between the storage system units or not (step 1015). When the first logical path does not require it, remapping is judged to be unnecessary and the processing is ended (step 1020).

As a result of the examination in step 1015, when the first logical path requires the data transfer between the storage system units, the port information 400 is used to judge whether an unused physical port is provided in the end unit A and can be newly connected to the host computer A or not (step 1025). When the unused physical port can be newly connected to the host computer A, a remapping command 750-C shown in FIG. 13(c) is prepared (step 1035).

The remapping command 750-C includes two parameters of a source logical port for remapping and a destination logical port for remapping. The remapping command 750-C is a command for instructing the clustering storage system 200 to stop accessing the logical volume A through the logical port A and to access the logical volume A through a new logical port by using the two parameters. The logical port A is set in the source logical port for remapping of the remapping command 750-C and any logical port of the unused physical port is set in the destination logical port for remapping.

As a result of the judgment in step 1025, when the unused physical port cannot be newly connected to the host computer A, the port information 400 is used to examine whether the end unit A includes an unused logical port connected to the host computer A or not (step 1030). When the unused logical port is included, a remapping command 750-C shown in FIG. 13(c) is prepared. In this example, the logical port A is set in the parameter for the source logical port for remapping of the remapping command 750-C and the logical port is set in the parameter for the destination logical port for remapping (step 1035).

As a result of the examination in step 1030, when the end unit A does not include an unused logical port connected to the host computer A, a set B of logical paths having the front unit equal to the end unit A and the logical volume accessed by the host computer A is collected from all of the logical paths. Further, the logical path set B is classified into three sets B1 to B3.

The logical path set B1 includes logical paths having the end unit equal to the front unit A in the logical path set B. The logical path set B2 includes logical paths having the end unit not equal to both of the front unit A and the end unit A in the logical path set B. The logical path set B3 includes logical paths having the end unit equal to the end unit A in the logical path set B (step 1040).

An example of the logical path sets B1 to B3 is shown in FIG. 10. In FIG. 10, a front unit of a first logical path is assumed to be #2, an end unit be #1, a logical volume be #1, and a host computer be A. An example of the logical path set B1 includes a logical path having the front unit #1 and the end unit #2. An example of the logical path set B2 includes a logical path having the front unit #1 and the end unit #3. An example of the logical path set B3 includes a logical path having the front unit #1 and the end unit #1. In the logical path sets B1 to B3, when the logical paths are remapped in order of B1, B2 and B3, the reduction effect of the data transfer amount between the storage system units is increased. The same thing is applicable similarly even in other logical path sets described later.

After the processing of step 1040, it is examined whether the logical path set B1 exists or not (step 1045). When the logical path set B1 exists, a logical path (hereinafter referred to as a second logical path) having a largest data transfer amount, for example, is selected from the logical path set B1. This selection is made because the data transfer amount between the storage system units relative to the first and second logical paths can be reduced by exchanging the logical ports for the first and second logical paths with each other. When such a second logical path exists, a remapping command 750-D shown in FIG. 13(*d*) is prepared (step 1065).

The remapping command 750-D includes two parameters of a logical port 1 for exchange and a logical port 2 for exchange. The remapping command 750-D is a command for instructing the clustering storage system 200 to access the logical volume accessed so far by using the logical port set in the logical port 1 for exchange by means of the logical port set in the logical port 2 for exchange and to access the logical volume accessed so far by using the logical port set in the logical port 2 for exchange by means of the logical port set in the logical port 1 for exchange. In the embodiment, the logical port numbers of the second and first logical paths are set in the logical ports 1 and 2 for exchange of the remapping command 750-D, respectively.

As a result of the examination in step 1045, when the logical path set B1 does not exist, it is examined whether the logical path set B2 exists or not (step 1050). When the logical path set B2 exists, any logical path (hereinafter referred to as a third logical path) is selected from the logical path set B2. This selection is made because the data transfer amount between the storage system units relative to the first logical path can be reduced since the first logical path becomes the same storage system unit together with the front unit and the end unit by exchanging the logical ports for the first and third logical paths with each other. When such a third logical path exists, the remapping command 750-D shown in FIG. 13(*d*) is prepared. In this example, the logical port numbers of the third and first logical paths are set in the logical ports 1 and 2 for exchange of the remapping command 750-D, respectively (step 1065).

As a result of the examination in step 1050, when the logical path set B2 does not exist, it is examined whether the logical path set B3 exists or not (step 1055). When the logical path set B3 exist, a logical path (hereinafter referred to as a fourth logical path) having a smallest data transfer amount, for example, is selected from the logical path set B3. However, when the data transfer amount of the fourth logical path is larger than that of the first logical path, it is not selected. This is made because the data transfer amount between the storage system units relative to the first logical path can be reduced although the data transfer amount between the storage system units relative to the fourth logical path is increased by exchanging the logical ports of the first and fourth logical paths with each other. When such a fourth logical path exists, the remapping command 750-D shown in FIG. 13(*d*) is prepared. In this example, the logical port numbers of the fourth and first logical paths are set in the logical port 1 and 2 for exchange of the remapping command 750-D, respectively (step 1065).

As a result of the examination in step 1055, when the logical path set B3 does not exist or when the fourth logical path does not exist (that is, when the logical path having the data transfer amount smaller than that of the first logical path does not exist) even if the logical path set B3 exists, it is judged that the data transfer amount between the storage system units cannot be reduced by remapping of the logical ports and the processing is ended (step 1060).

In an example of FIG. 10, the logical path set B is obtained from the same host computer A, while remapping of ports for the first logical path and the logical path from another host computer as shown by broken line, for example, can be made.

Figure 11:
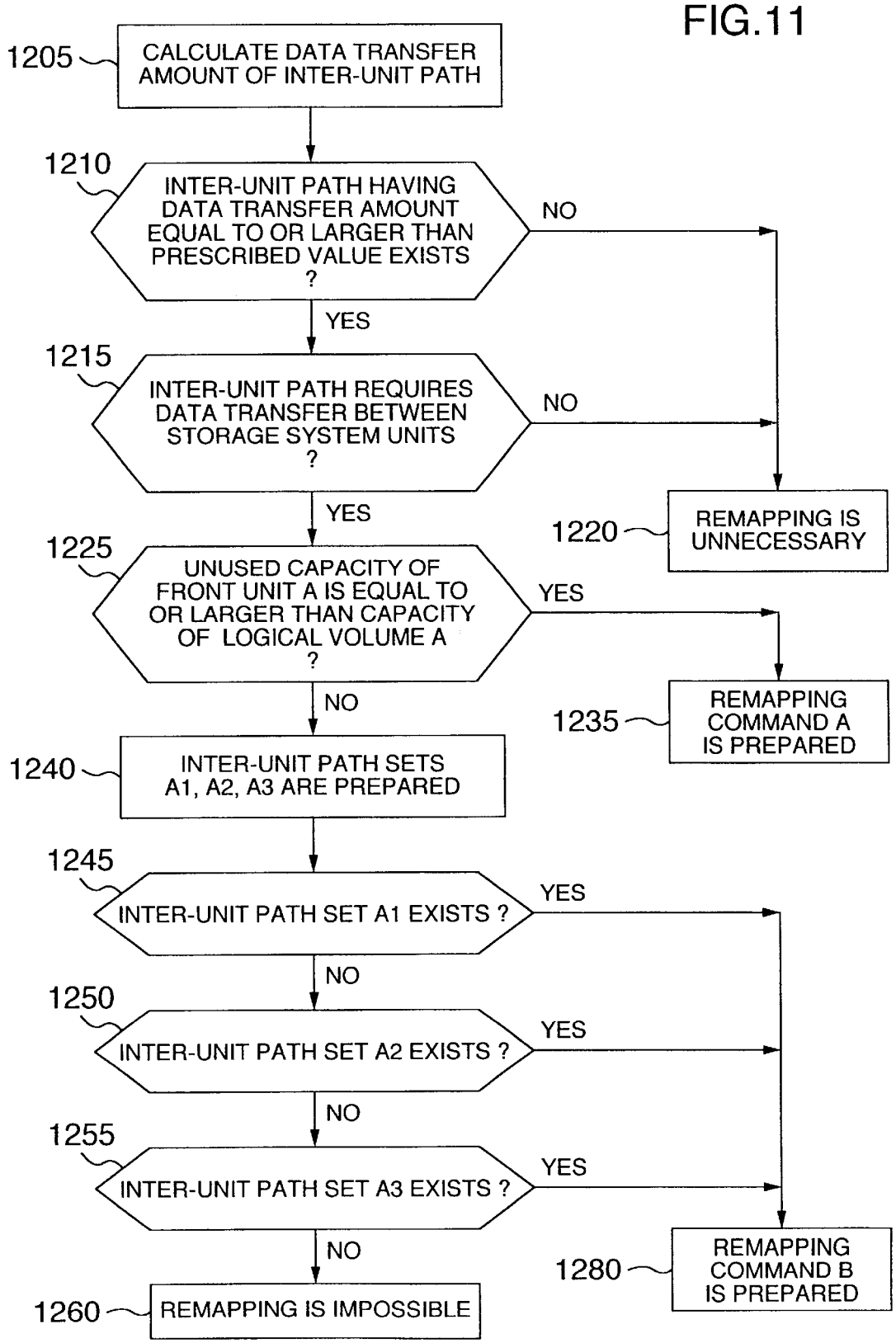
FIG. 11 is a flow chart showing operation of remapping logical volumes in FIG. 7.
Figure 12:
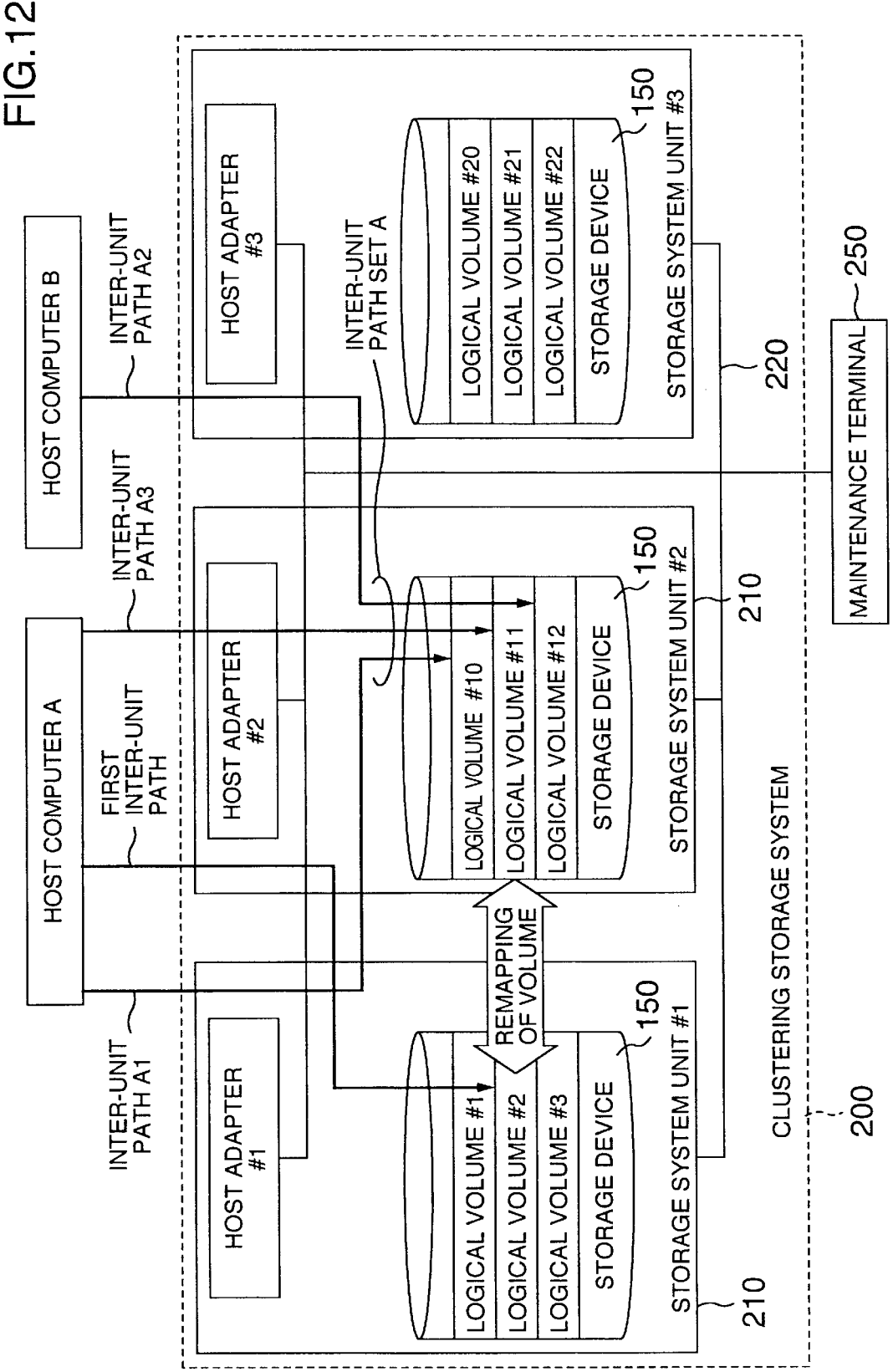
FIG. 12 is a diagram for explaining an example of inter-unit path sets A1 to A3 prepared in the remapping processing of the logical volumes.

FIG. 11 is a flow chart showing the logical volume remapping processing 780 in FIG. 7. FIG. 12 is a diagram for explaining an example of inter-unit path sets A1 to A3 prepared in the logical volume remapping processing 780. Description is now made to the case where the access frequency of the access information 700 is the data transfer amount.

First, data amounts of all inter-unit paths are calculated from the access information 700. The inter-unit path is defined as a virtual path between a storage system unit having a logical port for receiving a command and a logical volume. Further, the storage system unit having the logical port for receiving a command of the inter-unit path is named a front unit and the storage system unit for storing a logical volume of the inter-unit path is named an end unit. A data amount of a certain inter-unit path is a data transfer amount between the storage system units changing by remapping of data. A data amount of a certain inter-unit path can be calculated by subtracting the sum total of the data transfer amounts accessed to the logical volume of the inter-unit path by using any logical port in the end unit of the inter-unit path from the sum total of data transfer amounts accessed to the logical volume of the inter-unit path by using any logical path in the front unit of the inter-unit path. For example, when the port information 400 shown in FIG. 3, the physical storage position information 500 shown in FIG. 4 and the access information 700 shown in FIG. 6 are used, the data transfer amount of the inter-unit path between the front unit #4 and the logical volume #5 is calculated by subtracting the data transfer amount of the logical path #6 from the sum of the data transfer amount of the logical path #9 and the data transfer amount of the logical path #10. When the data amount of the inter-unit path is positive, it means that the data transfer amount between the storage system units relative to the inter-unit path is larger than the data transfer amount within the storage system unit and the data transfer amount between the storage system units can be reduced by remapping of the logical volumes. Further, when the data amount of the inter-unit path is negative, it means that the data transfer amount between the storage system units relative to the inter-unit path is smaller than the data transfer amount within the storage system unit and the data transfer amount between the storage system units is increased by remapping of the logical volumes (step 1205).

Next, it is examined whether an inter-unit path having the data transfer amount equal to or larger than a prescribed value exists in all inter-unit paths or not (step 1210). When a relevant inter-unit path does not exist, remapping is judged to be unnecessary and the processing is ended (step 1220).

As a result of the examination in step 1210, when a plurality of relevant inter-unit paths exist, the inter-unit path is selected successively in order of the magnitude of the data transfer amount, for example, and is subjected to the subsequent processing. The selected inter-unit path is named a first inter-unit path. A front unit of the first inter-unit path is assumed to be a front unit A, a logical volume is assumed to be a logical volume A, and a storage system unit for storing the logical volume A is assumed to be an end unit A. These information items can be obtained from the port information 400 and the physical storage position information 500. It is judged whether the first inter-unit path requires the data transfer between the storage system units or not (step 1215).

When it is unnecessary, remapping is judged to be unnecessary and the processing is ended (step 1220).

As a result of the judgment in step 1215, when the first inter-unit path requires the data transfer between the storage system units, the unused capacity information 600 is used to examine whether the unused capacity of the front unit A is equal to or larger than the capacity of the logical volume A or not (step 1225). When the unused capacity of the front unit A is equal to or larger than the capacity of the logical volume A, a remapping command 750-A shown in FIG. 13(*a*) is prepared (step 1235).

The remapping command 705-A includes two parameters of a source logical volume for movement and a destination storage system unit for movement. The remapping command 750-A is a command for instructing the clustering storage system 200 to prepare a destination logical volume for movement having the same format and capacity as the logical volume set in the source logical volume for movement within the storage system unit set in the destination storage system unit for movement, to copy data of the source logical volume for movement into the destination logical volume for movement, to replace the physical address information of the source logical volume for movement with the physical address information of the destination logical volume for movement after completion of the copying and to release the storage area for the source logical volume for movement. In this example, the logical volume A is set in the source logical volume for movement of the remapping command 750-A and the front unit A is set in the storage system unit.

As a result of the examination in step 1225, when the unused area of the front unit A is less than the capacity of the logical volume A, a set A of inter-unit paths having logical volumes stored in the storage system unit 210 equal to the front unit A and having logical volumes of which the format and the capacity are equal to those of the logical volume A is collected from all inter-unit paths. Further, the inter-unit path set A is classified into three sets A1 to A3. The inter-unit path set A1 includes inter-unit paths having the front unit equal to the end unit A in the inter-unit path set A. The inter-unit path set A2 includes inter-unit paths having the front unit not equal to the front unit A and the end unit A in the inter-unit path set A. The inter-unit path set A3 includes inter-unit paths having the front unit equal to the front unit A in the inter-unit path set A (step 1240).

An example of the inter-unit path sets A1 to A3 are shown in FIG. 12. In FIG. 12, a first inter-unit path is assumed to be a front unit #2 and a logical volume #1. An example of the inter-unit path set A1 includes an inter-unit path of a front unit #1 and a logical volume #10. An example of the inter-unit path set A2 includes an inter-unit path of a front unit #3 and a logical volume #12. An example of the inter-unit path set A3 includes an inter-unit path of the front unit #2 and a logical volume #11.

After the processing of step 1240, it is examined whether the inter-unit path set A1 exists or not (step 1245). When the inter-unit path set A1 exists, an inter-unit path (hereinafter referred to as a second inter-unit path) having a largest data transfer amount is selected from the inter-unit path set A1. This selection is made because the data transfer amount between the storage system units relative to the first and second inter-unit paths can be reduced by storing the logical volume A of the first inter-unit path in the end unit of the second inter-unit path and storing the logical volume of the second inter-unit path in the end unit A. When such a second inter-unit path exists, a remapping command 750-B shown in FIG. 13(*b*) is prepared (step 1280).

The remapping command 750-B includes two parameters of a logical volume 1 for exchange and a logical volume 2 for exchange. The remapping command 750-B is a command for instructing the clustering storate system 200 to replace data of the logical volume 1 for exchange with the logical volume 2 for exchange and, after this replacement, to replace the physical address information of the logical volume 1 for exchange with the physical address information of the logical volume 2 for exchange. In this example, the logical volume A and the logical volume of the second inter-unit path are set in the logical volume 1 for exchange and the logical volume 2 for exchange of the remapping command 750-B, respectively.

As a result of the examination in step 1245, when the inter-unit path set A1 does not exist, it is examined whether the inter-unit path set A2 exists or not (step 1250). When the inter-unit path set A2 exists, any inter-unit path (hereinafter referred to as a third inter-unit path) is selected from the inter-unit path set A2. This selection is made because the data transfer amount between the storage system units relative to the first inter-unit path can be reduced by storing the logical volume A of the first inter-unit path in the end unit of the third inter-unit path and storing the logical volume of the third inter-unit path in the end unit A. This reason is that the first inter-unit path is processed within the same storage system unit (e.g., #2 in FIG. 12). When such a third inter-unit path exists, the remapping command 750-B is prepared. In this example, the logical volume A and the logical volume of the third inter-unit path are set in the logical volume 1 for exchange and the logical volume 2 for exchange of the remapping command 750-B, respectively (step 1280).

As a result of the examination in step 1250, when the inter-unit path set A2 does not exist, it is examined whether the inter-unit path set A3 exists or not (step 1255). When the inter-unit path set A3 exists, an inter-unit path (hereinafter referred to as a fourth inter-unit path) having a smallest data transfer amount smaller than that of the first inter-unit path is selected from the inter-unit path set A3. This selection is made because the data transfer amount between the storage system units relative to the first inter-unit path can be reduced and the data transfer amount between the storage system units can be also reduced as a whole although the data transfer amount between the storage system units relative to the fourth inter-unit path is increased by storing the logical volume A of the first inter-unit path in the end unit of the fourth inter-unit path and storing the logical volume of the fourth inter-unit path in the end unit A. When such a fourth inter-unit path exists, the remapping command 750-B is prepared. In this example, the logical volume A and the logical volume of the fourth inter-unit path are set in the logical volume 1 for exchange and the logical volume 2 for exchange of the remapping command 750-B, respectively (step 1280).

As a result of the examination in step 1255, when the inter-unit path set A3 does not exist or when the fourth inter-unit path does not exist although the inter-unit path set A3 exists, it is judged that reduction of the data transfer amount between the storage system units by remapping of the logical volumes is impossible and the processing is ended (step 1260).

Next, the remapping processing 760*v* performed by the clustering storage system 200 in response to the remapping command 750 prepared in step 1235 and received by the clustering storage system 200 is described. When the clustering storage system 200 receives the remapping command 750-A, the clustering storage system 200 prepares a logical volume having the same format and capacity as the logical volume set in the source logical volume for movement within the system unit set in the destination storage system unit for movement and subtracts the capacity of the prepared logical volume from the unused capacity of the destination storage system unit for movement in the unused capacity information 600. The clustering storage system copies data of the source logical volume for movement into the destination logical volume for movement in the same manner as the remapping processing 760-B described later. After the completion of the copying of data, the physical address information of the destination logical volume for movement is changed to the physical address information of the source logical volume for movement and the storage area of the source logical volume for movement is released. Further, the capacity of the source logical volume for movement is added to the unused capacity of the storage system unit for storing the source logical volume for movement in the unused capacity information 600. The above processing can be made without suspension of the access request to the logical volume.

Figure 14:
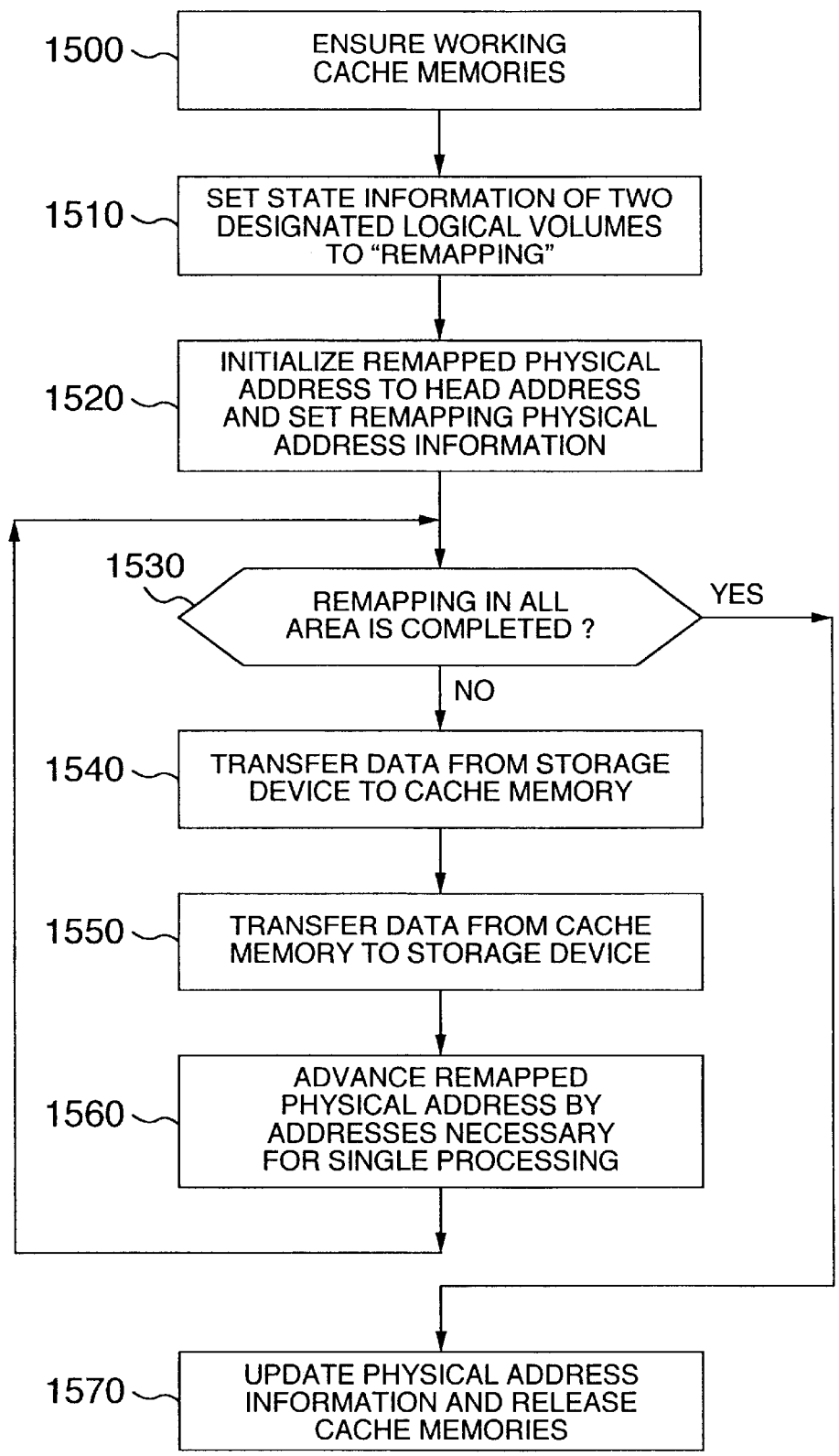
FIG. 14 is a flow chart showing logical volume remapping processing performed when the clustering storage system receives a remapping command.

FIG. 14 is a flow chart showing the logical volume remapping processing 760-B performed when the clustering storage system 200 receives the remapping command 750-B. As described above, the remapping command 750-B includes the parameters of a logical volume 1 for exchange and a logical volume 2 for exchange. In this description, the storage system unit 210 for storing the logical volume 1 for exchange is assumed to be a unit A and the storage system unit 210 for storing the logical volume 2 for exchange be a unit B.

First, the unit A and B ensure memory areas necessary for single remapping processing in the cache memories 130 (as cache memories A and B). The cache memories A and B may be the cache memories 130 of any storage system unit 210 (step 1500).

Next, the state information for the logical volumes 1 and 2 for exchange is set to "remapping" (step 1510). The remapped physical addresses for the logical volumes 1 and 2 for exchange are initialized to the head address. The remapping physical address information for remapping of the logical volume 1 for exchange is set to the physical address information of the logical volume 2 for exchange and the remapping physical address information of the logical volume 2 for exchange is set to the physical address information of the logical volume 1 for exchange (step 1520).

The remapped physical addresses for the logical volumes 1 and 2 for exchange are investigated to examine whether the remapping in all area is completed or not (step 1530). When the remapping in all area is completed, the physical address information of the logical volume 1 for exchange is exchanged with the physical address information of the logical volume 2 for exchange and the state information is returned to "normal". The cache memories 130 ensured in step 1500 are released and the processing is ended (step 1570).

As a result of the examination in step 1530, when the remapping in all area is not completed, the disk adapter 120 of the unit A reads out data necessary for single remapping processing from a physical address in the storage device 150 indicated by the remapped physical address for the logical volume 1 for exchange and stores the data into the cache memory A. Similarly, the disk adapter 120 of the unit B reads out data necessary for single remapping processing from a physical address in the storage device 150 indicated by the remapped physical address for the logical volume 2 for exchange and stores the data into the cache memory B (step 1540).

Next, the disk adapter 120 of the unit A reads out the data stored in the cache memory B in step 1540 and stores the data into the physical address indicated by the remapped physical address for the logical volume 1 for exchange. Similarly, the disk adapter 120 of the unit B reads out the data stored in the cache memory A in step 1540 and stores the data into the physical address indicated by the remapped physical address for the logical volume 2 for exchange (step 1550).

After the processing in step 1550, the remapped physical addresses for the logical volumes 1 and 2 for exchange are advanced by addresses necessary for single remapping processing. The process is returned to the processing from step 1530 and the same processing is repeated (step 1560).

The aforementioned remapping processing can be made without suspension of access to the logical volumes set to the logical volumes 1 and 2 for exchange.

The remapping processing performed when the clustering storage system 200 receives the remapping command 750-B has been described, while when another remapping command is received, the clustering storage system 200 is operated as follows:

When the clustering storage system 200 receives the remapping command 750-C, the clustering storage system 200 sets the logical volume A of the logical port set in the source logical port for remapping as the logical volume number of the logical port set in the destination logical port for remapping in the port information 400 and changes the logical volume number of the logical port set in the source logical port for remapping to unused state. After the change is completed, the clustering storage system 200 notifies the completion of change to the maintenance person through the maintenance terminal 250. It is necessary to suspend access to the logical volume A during the aforementioned processing.

When the clustering storage system 200 receives the remapping command 750-D, the clustering storage system 200 changes the logical volume number for the logical port set in the logical port 1 for exchange of the port information 400 to the logical volume A for the logical port set in the logical port 2 for exchange and also changes the logical volume number for the logical port set in the logical port 2 for exchange to the logical volume B for the logical port set in the logical port 1 for exchange. After completion of the change, the clustering storage system 200 notifies the completion of the change to the maintenance person by means of the maintenance terminal 250. During the aforementioned processing, access to the logical volumes A and B must be suspended.

When the maintenance person sets the logical volume to the logical port newly, the maintenance person sets the logical port to prepare the logical volume with reference to the access information 700 for all logical paths by means of the maintenance terminal 250 so that the data transfer amount between the storage system units is not increased to the utmost.

Next, description is made to the case where the host computer A uses the existing logical volume A by means of the unused logical port.

First, the storage system unit A in which the logical volume A is stored is examined. Next, whether an unused physical port exists in the logical system unit A or not is examined. When the unused physical port exists in the storage system unit A and this unused physical port can be connected to the host computer A newly, data transfer between the storage system units does not occur. Accordingly, the unused physical port is connected to the host computer A and the logical volume A is set to any logical port of the unused physical port. When any physical port satisfying the condition does not exist, the maintenance person examines whether an unused logical port exists in the physical port connected to the host computer A within the storage system unit A or not. When the logical port satisfying the condition exists, data transfer between the storage system units does not occur and accordingly the logical volume A is set to the logical port.

When the logical port satisfying the condition does not exist, data transfer between the storage system units necessarily occurs and accordingly the logical port A is set to any unused logical port. In this case, without causing the maintenance person to performing the study, the maintenance person may designate the logical volume A and a usable port from the maintenance terminal 250. Further, the maintenance terminal 250 may be caused to perform the study and to display its processing result on a display unit of the maintenance terminal 250 and the maintenance person may set the logical volume A to the logical port of the processing result. Further, instead of the maintenance person, the maintenance terminal 250 may set the logical volume A to the logical port of the result of the study automatically.

Next, description is made to the case where the host computer A uses the logical volume A prepared newly.

First, a set A of storage system units having the unused storage capacity exceeding the capacity of the logical volume A is examined. Next, whether a storage system unit B having an unused physical port exists within the set A of storage system units or not is examined. When the storage system unit B exists and the host computer A can be newly connected to the unused physical port B included in the storage system unit B, data transfer between the storage system units does not occur. Accordingly, the logical volume A is prepared in the storage system unit B, the host computer A is connected to the physical port B, and the logical volume A is set to any logical port of the physical port B.

When any storage system unit satisfying the condition does not exist, it is examined whether a storage system unit C connected to the host computer A and having an unused logical port within the physical port exists in the storage system unit set A. When the storage system unit C exists, data transfer between the storage system units does not occur. Accordingly, the logical volume A is prepared in the storage system unit C and the logical port A is set to an unused logical port of the storage system unit C.

When the storage system unit C does not exist, data transfer between the storage system units necessarily occurs. Accordingly, the logical volume A is prepared in any storage system unit of the storage system unit set A and the logical port A is set in any unused logical port. In this case, without causing the maintenance person to perform the study, the maintenance person may designate the format and the capacity of the logical volume to be prepared and a usable port in the maintenance terminal 250 to thereby cause the maintenance terminal 250 to perform the study and to display the result of the study on a display unit of the maintenance terminal 250, so that the logical volume A may be prepared in the storage system unit obtained as a result of the study and the logical volume A may be set to the logical port obtained as the result of the study. Further, instead of the maintenance person, the maintenance terminal 250 may prepare the logical volume A in the storage system unit of the result of the study automatically and set the logical volume A to the logical port of the result of the study.

In the embodiment of the present invention described above, in the clustering storage system 200 capable of operating the plurality of storage system units as a single storage system, the access information 700 is collected for each logical path to show it to the maintenance person by means of the maintenance terminal and the logical port remapping processing and the logical volume remapping processing are performed in accordance with the maintenance person's judgment based on the logical port remapping processing 770 and the logical volume remapping processing 780. Consequently, communication load between the storage system units constituting the clustering storage system 200 can be suppressed and the access performance of the clustering storage system 200 can be improved.

In the embodiment of the present invention, one of the logical port remapping processing and the logical volume remapping processing is selected to be performed in accordance with the logical path, while only one of the logical port remapping processing and the logical volume remapping processing may be performed for each logical path although effects in this case are reduced as compared with the above embodiment of the present invention. In this case, since the configuration of the system can be simplified, a cost of the whole system can be reduced.

Next, a modification example of the present invention is described. In this modification example, without causing the maintenance person to perform the logical port remapping processing 770, the maintenance terminal 250 of the clustering storage system 200 and one host adapter 110 or disk adapter 120 in the clustering storage system 200 perform the logical port remapping processing 770 with reference to the access information 700 and when the data transfer amount between the storage system units can be reduced by remapping of the logical port, the remapping of the port obtained as a result of the processing is proposed to a manager or the maintenance person of the host computer. The manager or the maintenance person of the host computer performs the proposed remapping of the port when it is judged to become a problem in operation.

Another modification example of the present invention is now described. In this modification example, without causing the maintenance person to perform the logical volume remapping processing 780, the maintenance terminal 250 of the clustering storage system 200 and one host adapter 110 or disk adapter 120 in the clustering storage system 200 perform the logical volume remapping processing 780 with reference to the access information 700 to perform remapping of the logical volume automatically.

Next, still another modification example of the present invention is described. In this modification example, the clustering storage system 200 collects the access information 700 and provides the port information 400, the physical storage position information 500, the unused capacity information 600 and the access information 700 to the host computer using the clustering storage system 200 to thereby performing the remapping processing 760 in response to the remapping command 750 from the host computer. The host computer or the manager of the host computer decides whether the logical port and the logical volume are remapped or not in accordance with the logical port remapping processing 770, the logical volume remapping processing 780 and the operation situation in the same manner as the aforementioned embodiment. Consequently, the remapping of the port and the data can be performed under high-degree conditions difficult for the maintenance person to judge. For example, judgement can be made in accordance with a situation in such a manner that the logical volume is remapped when a load is light.

What is claimed is:

1. A clustering storage system capable of operating a plurality of storage system units as a single storage system by connecting said plurality of storage system units with one another by a data connection line, comprising:
   a plurality of storage units, each storage unit being associated with at least one logical port for data communication with a computer, each storage unit being associated with one or more logical volumes;
   a data connection line in data communication with said storage units, wherein a data request received at a logical port associated with a logical volume in a storage unit can be serviced by a logical volume in a different storage unit;
   means for collecting access information related to frequency of data access from a logical port to a logical volume, including information representative of a logical port, a logical volume, and access frequency between said logical port and said logical volume; and
   means for remapping a port so that a logical port in a first storage unit can subsequently access a logical volume in a second storage unit via said data connection line, based on said access information.

2. A clustering storage system according to claim 1, wherein said access information contains a data transfer amount in a unit time from a logical port to a logical volume.

3. A clustering storage system capable of operating a plurality of storage system units as a single storage system by connecting said plurality of storage system units with one another by a data connection line, comprising:
   a plurality of storage units, each associated with one or more logical ports for data communication with computers, each associated with one or more logical volumes;
   a data connection line in data communication with said storage units to allow a computer to access a logical volume via a logical port, wherein the storage unit associated with said logical volume can be different from the storage unit associated with said logical port;
   means for collecting access information concerning frequency of data access between a logical port and a logical volume, said access information comprising information representative of a logical port, a logical volume, and access frequency between said logical port and said logical volume; and
   means for remapping data so that data that has been previously stored on a first logical volume in a storage unit is copied to a second logical volume in a different storage unit.

4. A clustering storage system according to claim 3, wherein said access information contains a data transfer amount in a unit time from a logical port to a logical volume.

5. A clustering storage system comprising:
   a plurality of storage units, each storage unit comprising:
      a host adapter that is associated with at least one logical port for data communication with a computer;
      a disk adapter operatively coupled to its host adapter; and
      at least one disk being associated with one or more logical volumes,
      said each storage unit being associated with at least one logical volume;
   a data connection line in data communication with said storage units, wherein a data request received at a logical port associated with a first storage unit can be serviced from a logical volume associated with a second storage unit different from said first storage unit;
   a memory having stored therein access information relating to frequency of data access between a logical port and a logical volume, said access information comprising information representative of a logical port, a logical volume, and access frequency between said logical port and said logical volume; and
   a port remapping unit configured to change, based on said access information, an association between a logical port of a first storage unit and a logical volume of a storage unit different from said first storage unit; and
   a volume remapping unit operable to copy data previously stored in a logical volume of a second storage unit to a logical volume of a storage unit different from said second storage unit.

6. A clustering storage system according to claim 5, wherein said access information contains a data transfer amount in a unit time from a logical port to a logical volume.

7. A clustering storage system according to claim 6 further comprising:
   means for showing said access information to a user; and
   means for receiving from a user a remapping command,
   wherein said port remapping unit changes a logical port used to access a logical volume according to said remapping command.

8. A clustering storage system according to claim 6 further comprising means for calculating a data transfer amount between storage units based on said access information, wherein said volume remapping unit copies data stored in a logical volume to another logical volume according to said data transfer amount.

9. A method of improving data access performance in a clustering storage system comprising a plurality of storage units, each storage unit being associated with at least one logical port for data communication with a computer, each storage unit being associated with one or more logical volumes, said storage units in data communication with each other via a data connection line such that a data request from a logical port associated with a first storage unit can be serviced from a logical volume associated with a second storage unit different from said first storage unit, the method comprising the steps of:
   updating access information relating to access frequency from a logical port to a logical volume in response to receiving a data access command received from a computer, said access information comprising information representative of a logical port, a logical volume, and access frequency between said logical port and said logical volume;
   selecting a first logical path comprising a first logical port that is associated with a first storage unit and a first logical volume that is associated with a second storage unit and a second logical path comprising a second logical port and a second logical volume; and
   remapping said first and second logical ports so that said second logical volume is now accessed by said first logical port thus defining a new first logical path, and said first logical volume is now accessed by said second logical port thus defining a new second logical path.

10. A method according to claim 9, wherein said selecting step comprises:
    classifying already established logical paths into first-type logical paths which use a logical volume in said first storage unit, second-type logical paths which use a logical volume in a storage unit other than said first and second storage units, and third-type logical paths which use a logical volume in said second storage unit; and selecting said second logical path from among said already established logical paths in priority order of said first, second and third types.

11. A method of improving data access performance in a clustering storage system comprising a plurality of storage units, each associated with one or more logical ports for data communication with computers, each associated with one or more logical volumes, the clustering storage system further comprising a data connection line in data communication with said storage units to allow a computer to access a logical volume via a logical port, wherein the storage unit associated with said logical volume can be different from the storage unit associated with said logical port, the method comprising the steps of:

updating access information relating to frequency of data access between a logical port and a logical volume in response to a data access command received from a computer, said access information comprising information representative of a logical port, a logical volume, and access frequency between said logical port and said logical volume;

selecting a first logical path comprising a first logical port that is associated with a first storage unit and a first logical volume that is associated with a second storage unit and a second logical path comprising a second logical port and a second logical volume; and copying first data that was previously stored in said first logical volume to said second logical volume so that said first data is accessed via a new first logical path comprising said first logical path and said second logical volume.

12. A method according to claim 11, wherein said selecting step comprises:

classifying already established logical paths into first-type logical paths which comprise a logical port of said second storage system, second-type logical paths which comprise a logical port of a storage unit other than said first and second storage units, and third-type logical paths which comprise a logical port of said first storage unit; and selecting said second logical path among said already established logical paths in priority order of said first, second and third types.

* * * * *